March 4, 1969
A. E. JUNKER
3,430,967
SEAL FOR A HIGH SPEED SHAFT
Filed Oct. 13, 1966
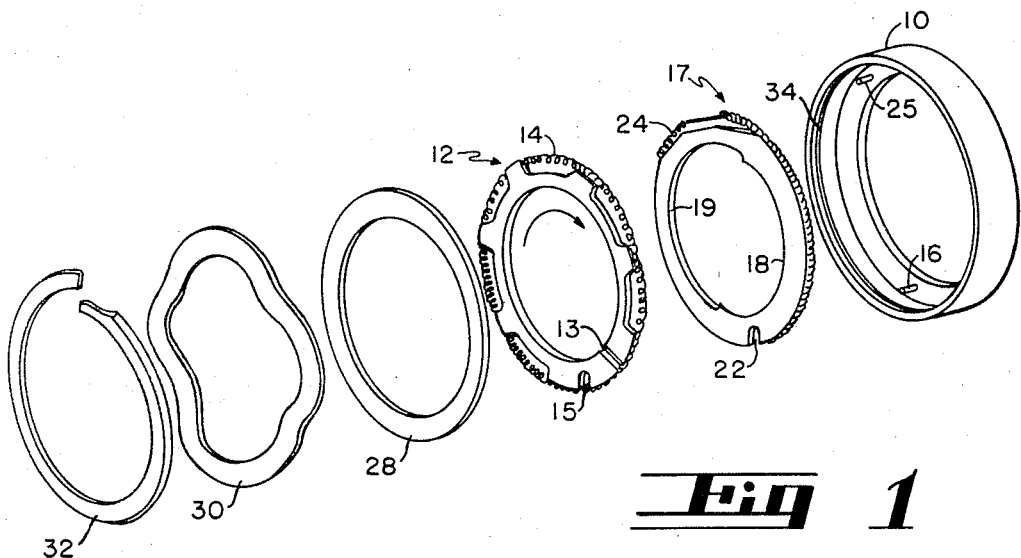
Fig 1
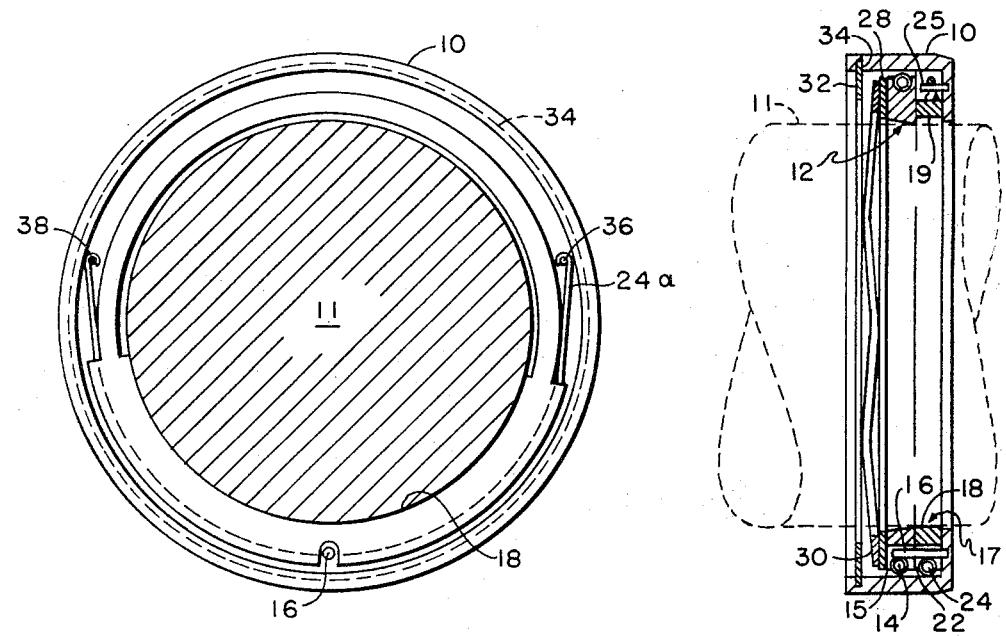
Fig 3
Fig 2
INVENTOR.
ARNOLD E. JUNKER
BY
ATTORNEYS.

United States Patent Office 3,430,967
Patented Mar. 4, 1969

3,430,967
SEAL FOR A HIGH SPEED SHAFT
Arnold E. Junker, Bridgeport, Conn., assignor to Avco Corporation, Stratford, Conn., a corporation of Delaware
Filed Oct. 13, 1966, Ser. No. 586,520
U.S. Cl. 277—137         7 Claims
Int. Cl. F16j 15/16

ABSTRACT OF THE DISCLOSURE

This disclosure relates to a carbon seal having two sealing elements, the first of which is a one-piece carbon ring with a single crack maintained in firm engagement with the shaft by a garter spring. The second element is a carbon ring, a portion of which is shaped to conform to the shaft and the remaining portion of which is enlarged with respect to the shaft. A spring positioned between the ring and the seal casing serves to maintain the shaft-shaped portion in contact with the shaft directly behind the crack in the primary sealing ring, so that together the two carbon rings provide effective sealing.

---

This invention relates to an improved seal, and more particularly to a carbon seal for a high speed shaft.

Ordinarily carbon seals of the piston-ring type are made up of a plurality of segments, the cracks between the segments being sealed by the corresponding segments of additional carbon elements located behind these cracks. The present invention provides an improved seal with only two sealing elements, the first of which is a one-piece carbon ring with a single crack maintained in firm engagement with the shaft by a garter spring. The second element is a carbon ring, a portion of which is shaped to conform to the shaft and the remaining portion of which is enlarged with respect to the shaft. A spring positioned between the ring and the seal casing serves to maintain the shaft-shaped portion in contact with the shaft directly behind the crack in the primary sealing ring, so that together the two carbon rings provide effective sealing.

It is an object of this invention to simplify the conventional piston-ring type of carbon seal by utilizing primary and secondary one-piece, carbon sealing rings, the primary ring having a single crack and the secondary ring being urged into intimate engagement with the shaft at the position of the crack by a peripherally positioned garter spring.

For further objects and advantages of this invention reference should be made to the accompanying drawings in which:

FIGURE 1 is a broken apart perspective view of a seal in accordance with this invention;

FIGURE 2 is a cross-sectional view of the seal of FIGURE 1; and

FIGURE 3 is a modified form of the invention.

Referring to the drawings, the seal consists of an annular seal casing 10 which houses the various seal elements for sealing a shaft 11. The primary sealing element consists of a carbon ring 12 having a crack 13. The ring 12 is maintained compressed on the shaft 11 by means of a peripherally positioned garter spring 14. A small slot 15 in the ring 12 is positioned on an anti-rotation pin 16 on the wall of the casing.

The secondary sealing element consists of a complete 360° carbon ring 17 having one portion 18 which conforms to the shaft to be sealed and another portion 19 of enlarged diameter. The portion 18 is less than 180° to permit slight radial movement on the shaft and is provided with a slot 22 which is positioned on the anti-rotation pin 16. A garter spring 24 is positioned around the outer periphery of the ring 17, and extending around a pin 25 on the seal case 10 so that the portion 18 is held firmly against the shaft 11.

When assembled, both the secondary and primary seal rings 17 and 12 are prevented from rotation by the pin 16, and the portion 18 of the seal ring 17 is located directly behind the crack 13 in the seal ring 12. Furthermore, the portion 18 is maintained in intimate relationship with the shaft by means of the spring 24. A washer 28 is positioned about the shaft on the ring 12 and a wavy spring 30 maintains the seal rings 12 and 17 under face contact pressure. A snap ring 32 positioned in a groove 34 in the seal case holds the entire assembly within the case.

Thus, there has been provided a seal in which the primary seal element provides all of the sealing except at its crack. The garter spring around the ring provides the force for urging the ring against the sealing surfaces on the shaft. The second carbon ring is a complete ring which provides sealing at the crack. The garter spring provided for this seal provides a radial tension to position the secondary seal ring at the point of the crack. The wavy spring 30 provides the axial force to prevent leakage between the two carbon rings and the case. When the shaft 11 is rotated in the direction of the arrow, the compression of ring 12 is increased to improve sealing under dynamic conditions.

It will be apparent that many modifications of this invention are available to persons skilled in the art. For example, in the embodiment of FIGURE 3 the spring 24a for the secondary carbon ring is positioned between two pins 36 and 38 on the seal casing and extends around the outer periphery of the portion 18 of the secondary seal ring. This spring has the effect of urging the seal ring radially inwardly at the point of the seal crack in the primary ring.

By inserting a third carbon ring such as the ring 17 on the opposite side of ring 12, sealing will be accomplished in both directions and the arrangement functions as a check seal.

The primary advantage of this invention is its simplicity, both in manufacture and installation. This novel seal fits the same geometry available for state-of-the-art seals.

What is claimed is:
1. A seal for a rotatable cylindrical shaft, the combination comprising:
   a stationary annular seal casing;
   a radially compressible primary seal ring, said primary seal ring having a radial crack, said primary seal ring conforming when compressed to the outer circumference of said shaft except at said crack;
   a non-compressible secondary seal ring, said secondary seal ring being continuous and being loosely fittable on said shaft, said secondary seal ring conforming to the outer circumference of said shaft for less than 180 degrees, said primary and secondary seal rings being positioned around said shaft within said annular seal casing;
   first spring means for radially compressing said primary seal ring against said shaft;
   second spring means for urging said secondary seal ring into contact with said shaft at the position of said crack; and
   third spring means for axially urging said primary and secondary seals into contact.

2. The invention as defined in claim 1, and means for preventing the relative rotation of said rings.

3. The invention as defined in claim 1 wherein said second spring means includes a garter spring positioned around the periphery of said secondary ring, and at least one pin on said casing, said spring being engaged by said pin.

4. The invention as defined in claim 3 wherein the inner circumference of said secondary seal ring is larger than the outer circumference of said shaft, except for a portion thereof adjacent said crack, said portion being less than 180 degrees and conforming generally to the contours of said shaft.

5. The invention as defined in claim 1 wherein said first spring means is a garter spring positioned around the periphery of said primary ring.

6. The invention as defined in claim 5 wherein the inner circumference of said secondary seal ring is larger than the outer circumference of said shaft, except for a portion thereof adjacent said crack, said portion being less than 180 degrees and conforming generally to the contours of said shaft.

7. The invention as defined in claim 6 wherein said means for urging said secondary seal ring into contact with said shaft comprises a garter spring positioned around the periphery of said secondary ring and at least one pin on said casing, said spring being engaged by said pin.

References Cited

UNITED STATES PATENTS

| 2,867,458 | 1/1959 | Kroekel | 277—137 |
| 2,908,516 | 10/1959 | Stein | 277—137 |
| 3,235,274 | 2/1966 | Cain et al. | 277—156 X |

FOREIGN PATENTS 826,895 1/1960 Great Britain.

SAMUEL ROTHBERG, *Primary Examiner.*

U.S. Cl. X.R.

277—142